United States Patent [19]

Shimizume et al.

[11] Patent Number: 5,590,106
[45] Date of Patent: Dec. 31, 1996

[54] DISC PLAYER HAVING A PLURALITY OF READING MEANS FOR READING INFORMATION ON A DISC

[75] Inventors: Kazutoshi Shimizume; Mamoru Akita, both of Kanagawa, Japan

[73] Assignee: Sony Corporation, Japan

[21] Appl. No.: 561,234

[22] Filed: Nov. 21, 1995

[30] Foreign Application Priority Data

Nov. 25, 1994 [JP] Japan .................................. 6-291018

[51] Int. Cl.$^6$ ........................................................ G11B 7/00
[52] U.S. Cl. ................................................... 369/50; 369/32
[58] Field of Search ............................... 369/50, 124, 32, 369/112, 44.37, 54, 58

[56] References Cited

U.S. PATENT DOCUMENTS

| | | | |
|---|---|---|---|
| 5,163,035 | 11/1992 | Horikiri | 369/50 |
| 5,280,462 | 1/1994 | Yokogawa | 369/50 |
| 5,347,506 | 9/1994 | Matsudo et al. | 369/50 |
| 5,463,604 | 10/1995 | Naito | 369/50 |
| 5,477,517 | 12/1995 | Gehringer et al. | 369/50 |
| 5,497,276 | 3/1996 | Kakuda | 369/50 |

FOREIGN PATENT DOCUMENTS

| | | |
|---|---|---|
| 0506447A1 | 9/1992 | European Pat. Off. . |
| 0649131A3 | 4/1995 | European Pat. Off. . |
| 60-029984 | 6/1985 | Japan . |
| 63-000870 | 6/1988 | Japan . |
| 63-122064 | 10/1988 | Japan . |
| 05274773 | 1/1994 | Japan . |

*Primary Examiner*—Nabil Hindi
*Attorney, Agent, or Firm*—Ronald P. Kananen

[57] ABSTRACT

A plurality of pickups are provided for reading information recorded on a disc. Each of the pickups is provided with a signal processing system and a control system. Each of the signal processing systems and control systems is controlled by a system controller such that, while one pickup is reading the information, another pickup is moved to a next information reading position and put in a standby state. As soon as the former pickup has completed the reading operation, the latter pickup gets out of standby state to be ready for reading the information at the above-mentioned position. The novel setup reduces seek time significantly.

14 Claims, 6 Drawing Sheets

DISC PLAYER HAVING A PLURALITY OF READING MEANS FOR READING INFORMATION ON A DISC

BACKGROUND OF THE INVENTION

1. Field of the Invention

The present invention relates to a disc player and, more particularly, to a disc player suitable for use in reproducing a CD-ROM used as a medium for storing data and programs.

2. Description of Related Art

In a CD-ROM (Compact Disc Read-Only Memory) reproducing apparatus, rotational control is performed by setting a target rotational speed of a spindle servo always to the frequency of a frame synchronization signal of 7.35 KHz or an integral multiple thereof. A PLL (Phase-Locked Loop) circuit for generating a clock based on which an EFM (Eight-to-Fourteen Modulation) signal reproduced from a disc is processed is constituted such that the center frequency of the PLL circuit is set to a channel clock of the EFM signal to be generated when the spindle rotational speed is equal to the target rotational speed. Such a setup allows the CD-ROM reproducing apparatus to read data from the disc when the spindle rotational speed has approached the target value and has entered a capture range of the PLL circuit.

In the spindle servo control described above, a servo error signal is generated from the EFM signal. That is, servo control is made so that the difference between a time interval and a target value of a reproduced frame synchronization signal becomes zero. Therefore, when an information reading optical spot radiated from an optical pickup (hereinafter referred to simply as a pickup) has traversed recording tracks (namely, recording pit trains) on the disc, the time interval of the reproduced frame synchronization signal becomes inaccurate because of the spot's crossing a mirror surface between tracks and the discontinuation of the EFM signal, thereby failing the correct control of spindle servo-mechanism.

Meanwhile, one important performance characteristic of the CD-ROM is a seek time in which the pickup is moved to a next data read position. Since the CD-ROM player has only one pickup, the pickup can begin to move only after reading data at a position, at least requiring a time for the movement. This restricts any shortening of the seek time. In addition, as described above, spindle servomechanism cannot be controlled precisely during a traverse time Data can be read from the disc only when the spindle rotational speed has approached a target value and has entered the capture range of the PLL circuit, thus requiring a time to some extent for the pickup to reach a next read position to be able to read data.

SUMMARY OF THE INVENTION

It is therefore an object of the present invention to provide a disc player that reduces the seek time significantly to realize a high-speed seek operation.

In carrying out the invention and according to one aspect thereof, there is provided a disc player comprising a spindle motor for rotationally driving a disc; a plurality of pickups for reading information recorded on the disc; a clock generator for detecting a speed difference between spindle rotational speed and target rotational speed based on each of read signals of the plurality of pickups to generate a system clock of which frequency varies according to the detected speed difference; a plurality of spindle servo circuits for detecting a phase difference between the system clock and a reference clock to output a servo error signal corresponding to the detected phase difference; a plurality of signal processors for processing each of the read signals of the plurality of pickups based on the system clock; a selector for selecting one of the output signals of the plurality of spindle servo circuits to supply the selected signal to the spindle motor; and a controller for controlling the selector so as to select a servo error signal based on the read signal of one pickup of the plurality of pickups that is performing a reading operation.

In the above-mentioned disc player, the frequency of the system clock is controlled according to the speed difference between spindle rotational speed and target rotational speed and the spindle rotational speed is controlled according to the phase difference between the system clock and a reference clock. This novel constitution allows the signal processor for performing signal processing based on the system clock to follow the spindle rotational speed, enabling the plurality of pickups to read data simultaneously. Consequently, while one of the pickups is reading data, another pickup can be moved to a next data reading position and put in standby state there and, upon completion of the data reading by the reading pickup, start reading the data at the position. Thus, the seek time can be reduced significantly to realize high-speed seek.

The above and other objects, features and advantages of the present invention will become more apparent from the accompanying drawings, in which like reference numerals are used to identify the same or similar parts in several views.

DESCRIPTION OF THE PREFERRED EMBODIMENTS

This invention will be described in further detail by way of example with reference to the accompanying drawings.

Figure 1:
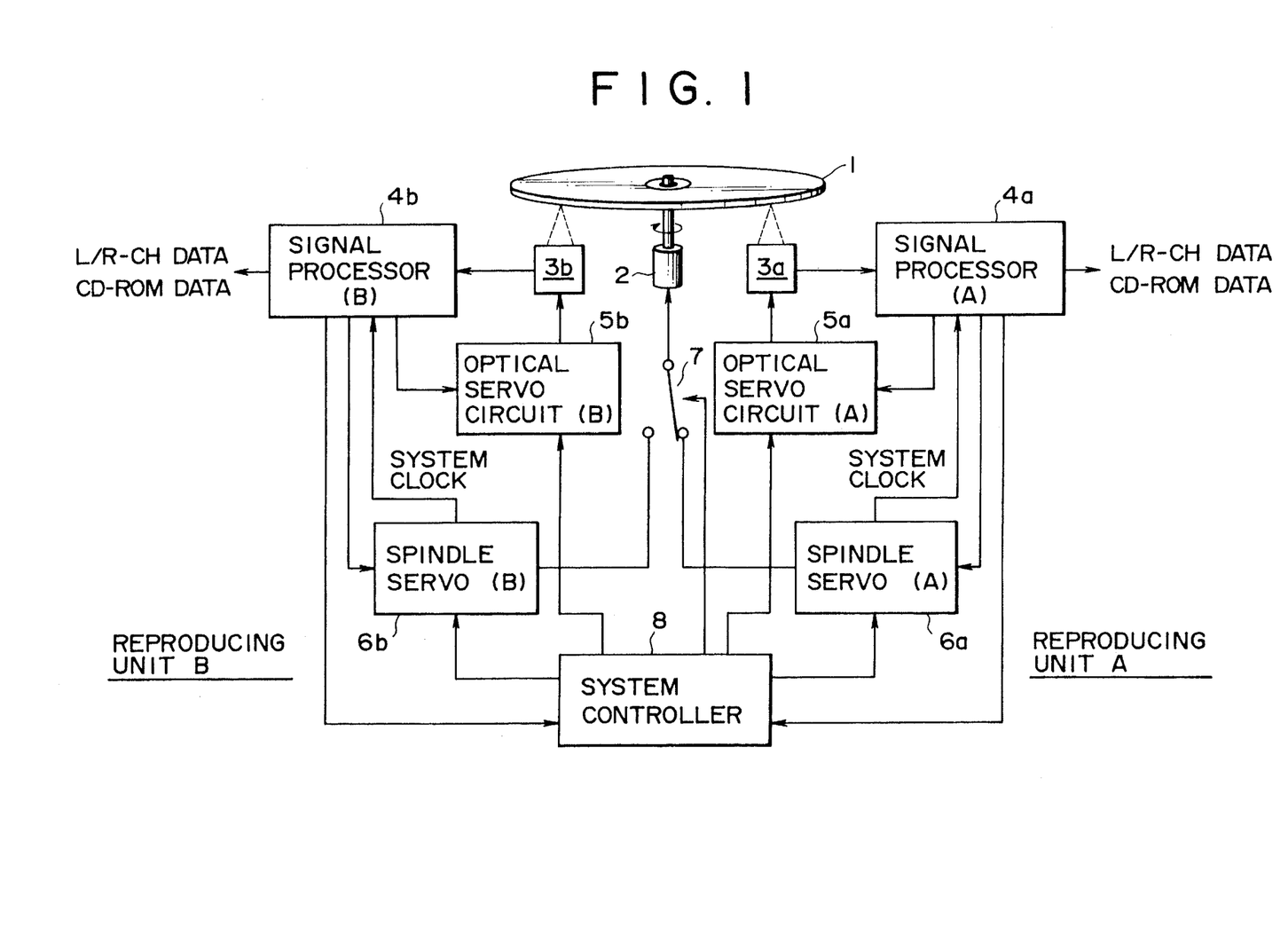
FIG. 1 is a schematic block diagram illustrating a CD or CD-ROM player practiced as a first preferred embodiment of the invention.

Now, referring to FIG. 1, there is shown a schematic block diagram illustrating a CD or CD-ROM player practiced as the first embodiment of the invention. In the figure, disc 1 that is a CD (Compact Disc) or CD-ROM (Compact Disc Read-Only Memory) is rotationally driven by a spindle motor 2. To read information recorded on the disc, two optical pickups (reading means) 3*a* and 3*b*, for example, are provided. Each of the two pickups 3*a* and 3*b* is provided, respectively, with signal processors 4a and 4b for performing signal processing such as waveform shaping, demodulation and error correction, optical servo circuits 5a and 5b consisting of servo systems associated with the two pickups, and spindle servo circuits 6a and 6b for controlling the rotation of the spindle motor 2. It should be noted that output signals of the spindle servo circuits 6a and 6b are selectively supplied by a selector switch 7 to the spindle motor 2 as its drive signal. Control of the entire system including the control of the selector switch 7 is performed by a system controller 8 composed of a CPU (Central Processing Unit).

Because the disc player of the above-mentioned constitution has the two pickups 3a and 3b, it is possible that, while one of the pickups is reading data, another pickup can be moved in advance to a data position to be read next. As mentioned above, the rotational control of the spindle motor is performed based on the output signal of the spindle servo circuit of the pickup that is reading data. This rotational control is useful when moving another pickup (namely, a pickup not currently reading data) to the next data position, which will be described later. To implement these capabilities, the signal processing systems and the control systems for the two pickups 3a and 3b are completely identical in constitution.

Figure 2:
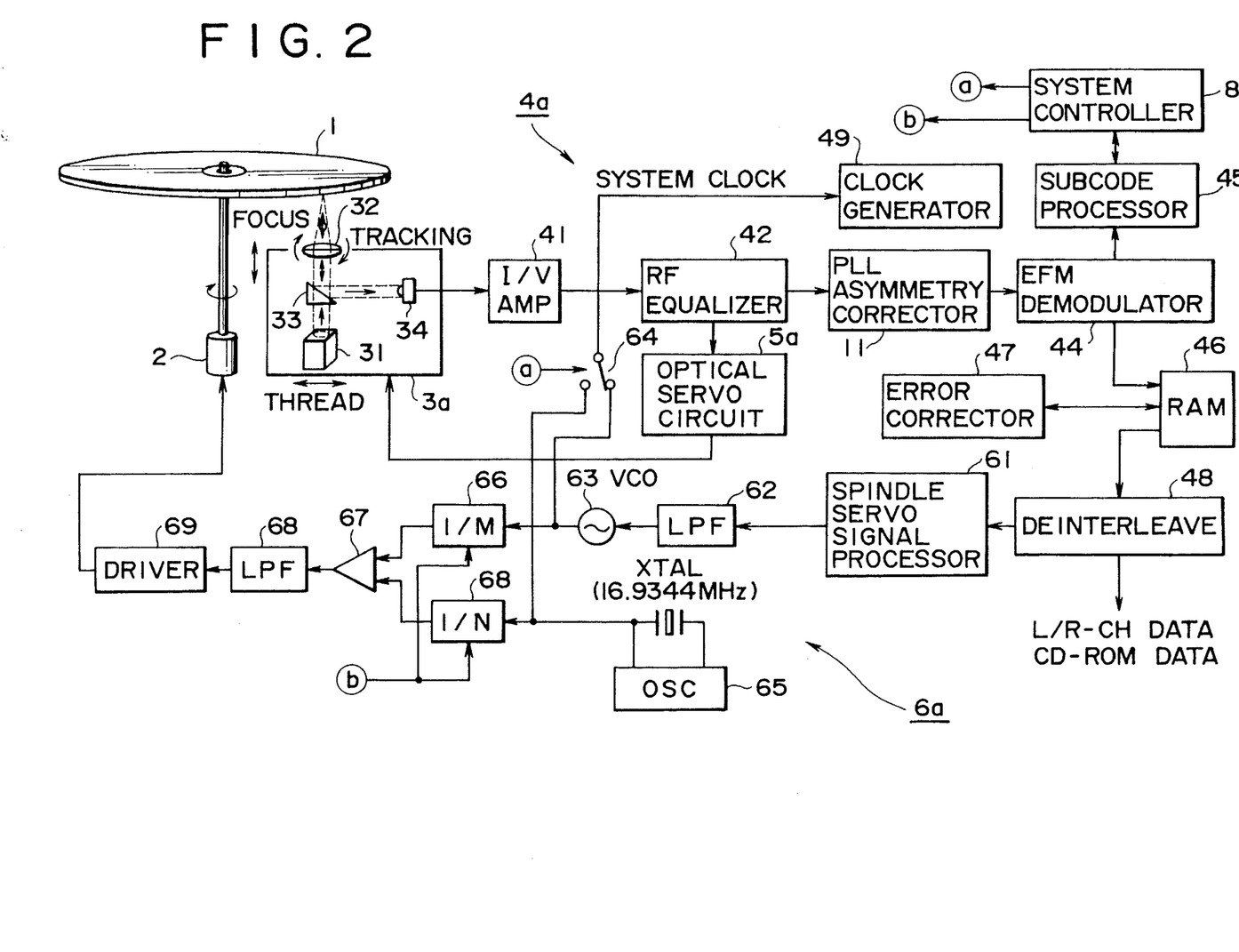
FIG. 2 is a block diagram illustrating a signal processing system and a control system practiced as a second preferred embodiment of the invention.

The following describes the CD or CD-ROM player practiced as the second preferred embodiment of the invention. Referring to FIG. 2, there is shown an example of a constitution of the signal processing system and the control system of the pickup 3a. As shown, the pickup 3a is composed of a laser diode 31, an objective lens 32 for converging laser beam coming from the later diode 31 onto the disc 1 at the signal surface thereof as an information reading optical spot, a polarization beam splitter 33 for changing the travel direction of a beam reflected from the disc 1, and a photo detector 34 for receiving the reflected beam. The pickup 3a is arranged to be movable in disc radial direction by a thread feed motor, not shown. Further, the pickup 3a incorporates a tracking actuator, not shown, for deflecting the information reading optical spot in disc radial direction relative to a recording track of the disc 1 and a focus actuator, not shown, for moving the objective lens 32 along its optical axis.

The output signal of the pickup 3a is supplied to the signal processor 4a. In the signal processor 4a, the RF signal coming from the pickup 3a 10 converted from a current signal to a voltage signal by an I (current)/V (voltage) amplifier 41, the resultant voltage signal being waveform-shaped by an RF equalizer 42 to be supplied to a PLL asymmetry corrector 43. In the PLL asymmetry corrector 43, the signal is corrected of asymmetry to provide a binary EFM signal. Based on an edge of the binary EFM signal, a consecutive clock pulse train is generated according to the PLL constitution. The term "asymmetry" used herein denotes an offset of the center of an eye pattern of the RF signal from the center of amplitude.

Then, the EFM signal is demodulated by the EFM demodulator 44 to provide demodulated data and a parity for error correction and detection and a subcode immediately following the frame synchronization signal is demodulated. The resultant subcode is supplied via a subcode processor 45 to the system controller 8. The EFM-demodulated data is stored in a RAM (Random Access Memory) 46 to be error-corrected by the error corrector 47 based on the error correction and detection parity. The error-corrected data is then deinterleaved of CIRC (Cross Interleave Reed-Solomon Code) by a deinterleave circuit 48 to be outputted as L/R-channel audio data at CD reproduction or as CD-ROM data at CD-ROM reproduction. It should be noted that the signal processor 4a incorporates a clock generator 49 that generates clocks for performing a variety of signal processing operations based on a system clock to be described.

Meanwhile, the optical servo circuit 5a controls the servo systems associated with the operations of the pickup 3a; namely, the tracking servo system for making the information reading optical spot follow a recording track on the disc 1, the focus servo system for always keeping the information reading optical spot focused on the signal surface of the disc 1, and the thread servo system for performing positional control of the pickup 3a in the disc radial direction. The optical servo circuit 5a has a constitution in which a tracking error signal detected by a known technique such as the three-beam method is fed to the tracking actuator, a focus error signal detected by a known technique such as the astigmatism method is fed to the focus actuator, and an error signal obtained by integrating the tracking error signal for example is fed to the thread feed motor.

Figure 3:
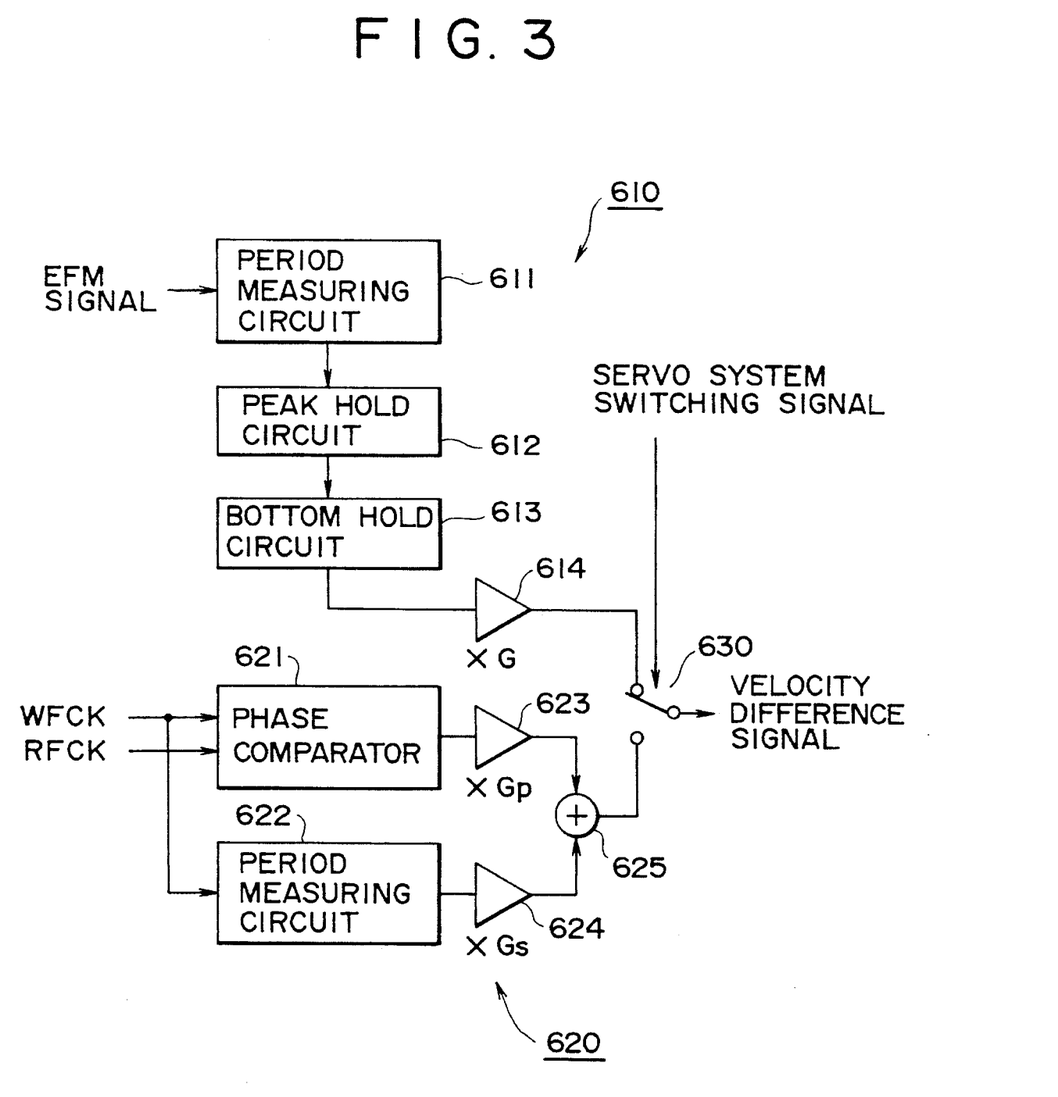
FIG. 3 is a block diagram illustrating an example of a constitution of a spindle servo circuit practiced as a third preferred embodiment of the invention.

The following describes a constitution of the spindle servo circuit 6a practiced as the third preferred embodiment of the invention. First, a spindle servo signal processor 61 detects a speed difference between a rotational speed of the spindle motor 2 (hereinafter referred to simply as a spindle rotational speed) and a target rotational speed based on the reproduced frame synchronization signal coming from the disc 1 to output a signal corresponding to the detected speed difference. The constitution of the spindle servo signal processor is shown in FIG. 3 by way of example. As shown, the spindle servo signal processor is composed of a rough servo circuit (a pull-in circuit) 610 for pulling the spindle rotational speed into a rough precision range and a phase lock servo circuit 620 for performing precision control on the roughly controlled spindle rotational speed.

In the rough servo circuit 610, a period of a portion that is equivalent to a frame synchronization in the EFM signal, the reproduced signal coming from the disc 1, is measured by a period measuring circuit 611. Based on the measured period, a minimum frequency signal 11T (T =a length of basic unit of pit) on the disc 1. Based on the signal 11T, a peak value within a predetermined period Ta is held in a peak hold circuit 612. Then, a bottom value in that peak value is held within a period Tb greater than the period Ta in a bottom hold circuit 613, thereby detecting the reproduced frame synchronization signal. This setup permits the detection of the original reproduced frame synchronization signal while excluding undesired effects such as a noise caused by dropout. The reproduced frame synchronization signal is then multiplied by G in an amplifier 614 to be outputted via a selector switch 630 as a speed difference signal.

The following describes the processing to be performed when a 3T pulse signal has been detected. The 3T pulse has occured means a maximum frequency pulse in the EFM signal. In this case, the peak hold circuit 612 and the bottom hold circuit 613 of FIG. 3 are connected in the reverse order. In the frequency counter 611, the 3T pulse in all pulses is measured and a maximum frequency in Tb frequencies is detected in the bottom hold circuit 613. The detected maximum frequency signal is fed to the peak hold circuit 612 to detect a peak value (minimum frequency) from among the maximum frequencies between periods Tb during a period Ta longer than the period Tb. The detected peak value is then held. This setup eliminates a noise that may be generated when the pickup comes in contact with a track being traversed.

On the other hand, the phase lock servo circuit 620 detects a phase difference between a reproduced clock signal WFCK (write frame clock) of which one period spans from a reproduced frame synchronization signal to another and a reference clock signal RFCK by means of a phase comparator 621. The phase lock servo circuit is constituted by two loops; a phase loop in which phase lock is performed by making control based on the detected phase difference and a speed loop in which the period of the reproduced clock signal WFCK is measured by a period measuring circuit 622 and its frequency is controlled to be the reference frequency 7.35 KHz. In the phase lock servo circuit 620, an output of the phase comparator 621 is multiplied by Gp by an amplifier 623 and an output of the period measuring circuit 622 is multiplied by Gs by an amplifier 624. Then, outputs of both the amplifiers are added together by an adder 625 to be outputted via the selector switch 630 as a speed difference signal.

Switching between the servo systems in the spindle servo signal processor 61 is performed by the selector switch 630 according to the servo switching signal outputted from the system controller of FIG. 1. To be more specific, at the time of pull-in, the selector switch 630 is switched to the rough servo circuit 610 to pull the spindle rotational speed into a rough precision by the control of the circuit 610. This allows the PLL of the phase lock servo circuit 620 to be locked, making it ready to reproduce information from the disc 1. At the time the PLL is locked, the selector switch 630 is switched from the rough servo circuit 610 to the phase lock servo circuit 620. This switches the servo systems from the rough servo system of the primary loop to the phase lock servo system of the secondary loop.

At the time of a seek operation, switching is made from the phase lock servo system to the rough servo system to move the pickup 3a (3b) in disc radial direction as described before. When the pickup has moved by the predetermined number of tracks and the spindle rotational speed has reached an approximate linear speed, switching is made from the rough servo system to the phase lock servo system to read a subcode from the disc 1. This series of operations is repeated until the pickup 3a (3b) reaches a target address position. When the pickup 3a (3b) moves in disc radial direction, the information reading optical spot traverses recording tracks, a tracking error signal having a sine waveform is generated during the traverse period. Based on the tracking error signal, the number of tracks traversed by the information reading optical spot is counted.

Referring to FIG. 2 again, the speed difference signal outputted from the spindle servo signal processor 61 is supplied through the LPF (Low-Pass Filter) to the VCO (Voltage-Controlled Oscillator) 63 as its control voltage. An oscillation clock of this VCO 63 provides one input to the selector switch 64. The selector switch 64 receives a fixed clock of 16.9344 MHz (44.1 KHz×384), for example, generated by a crystal oscillator as another input, and, controlled by the system controller 8, 14 selects either the oscillation clock of the VCO 28 or the fixed clock of 16.9344 M Hz to supply the selected clock to the clock generator 49 as a system clock.

The clock generator 49 generates a clock of a fixed frequency when the fixed clock of the crystal oscillator 65 has been selected as the system clock or a clock of a variable frequency according to an output voltage of the LPF 62 when the oscillation clock of the VCO 63 has been selected as the system clock. In addition, the oscillation clock of the VCO 63 is divided by M by a 1/M divider 66 to provide one input to a phase comparator 67. The fixed clock of the crystal oscillator 65 is divided by N by a 1/N divider 68 to provide the other input to the phase comparator 67 as a reference clock. It should be noted that M and N are variables that can be any number and are set to proper values by the system controller 8. The phase comparator 67 detects a phase difference between divided outputs of the 1/M divider 66 and the 1/N divider 68 to output a servo error signal corresponding to the detected phase difference. This servo error signal is supplied to a spindle driver 69 as a signal for driving the spindle motor 2.

In the control system having the above-mentioned constitution, when the selector switch 64 is in the mode for selecting the fixed clock of the crystal oscillator 65, the frequency of the system clock is fixed to 16.9344 MHz. Namely, the constitution becomes the same as the constitution of the control system of the related-art disc player, in which the spindle servo system is controlled such that the spindle rotational speed is equal to the reference rotational speed. This prevents the EFM signal from being deviated along the time axis, thereby providing audio output without wow and flatter especially at CD playback.

On the other hand, when the selector switch 64 is in the mode for selecting the oscillation clock of the VCO 63, the system clock is varied so that the speed difference signal outputted from the spindle servo signal processor reaches zero. Namely, even if the spindle rotational speed is comparatively loose, the system clocks varies following the rotational speed. This denotes that the center frequency of the PLL of the PLL asymmetry corrector 43 follows the rotational speed of the disc 1, providing locking of a relatively wide range. This mode is suitable for CD-ROM playback for a reason to be described.

Meanwhile, the playback speed of the disc 1 can be set as desired by varying the M and N values of the 1/M divider 66 and the 1/N divider 68 respectively. For example, if M=N, the frequencies of the divided outputs of the 1/M divider 66 and the 1/N divider 68 become equal, providing playback of about times one (×1) speed. Now, let the frequency of the oscillation clock of the VCO 63 be Fa and the frequency of the fixed clock of the crystal oscillator 65 be Fb, then $$Fa=(M/N)\cdot Fb.$$

If M/N=2, the frequency Fa of the oscillation clock of the VCO 63 becomes twice as high as the frequency Fb of the fixed clock of the crystal oscillator 65, providing double-speed playback.

The signal processing system and the control system both having the above-mentioned constitutions are provided for each of the two pickups 3a and 3b of FIG. 1, for example, realizing a disc player having two reproducing units. The following describes operations to be performed when the reproducing unit A is on the pickup 3a and the reproducing unit B is on the pickup 3b with the selector switch 7 turned to the reproducing unit A. If the dividers 66 and 68 of the reproducing unit A are set to 1/M=1/N in FIG. 2, the rotational speed of the disc 1 is controlled so as to reach a normal rotational speed in the reproducing unit A.

Meanwhile, the spindle motor 2 is controlled so as to reach the normal rotational speed but an actual rotational speed does not continue matching completely a target value due to the spindle servo loop characteristic. The speed difference is supplied from the spindle servo signal processor 61 to the VCO 63 to cause the oscillation of the VCO to change enough for canceling the speed difference, resulting in system stabilization. Namely, the signal processor 4a follows the rotational speed of the disc 1. The same holds with the reproducing unit B, in which the number of rotations of the disc 1 is controlled by the reproducing unit A but the signal processor 4b follows this spindle rotational speed, enabling a data read operation at the same time in both reproducing units.

Figures 4, 4B:
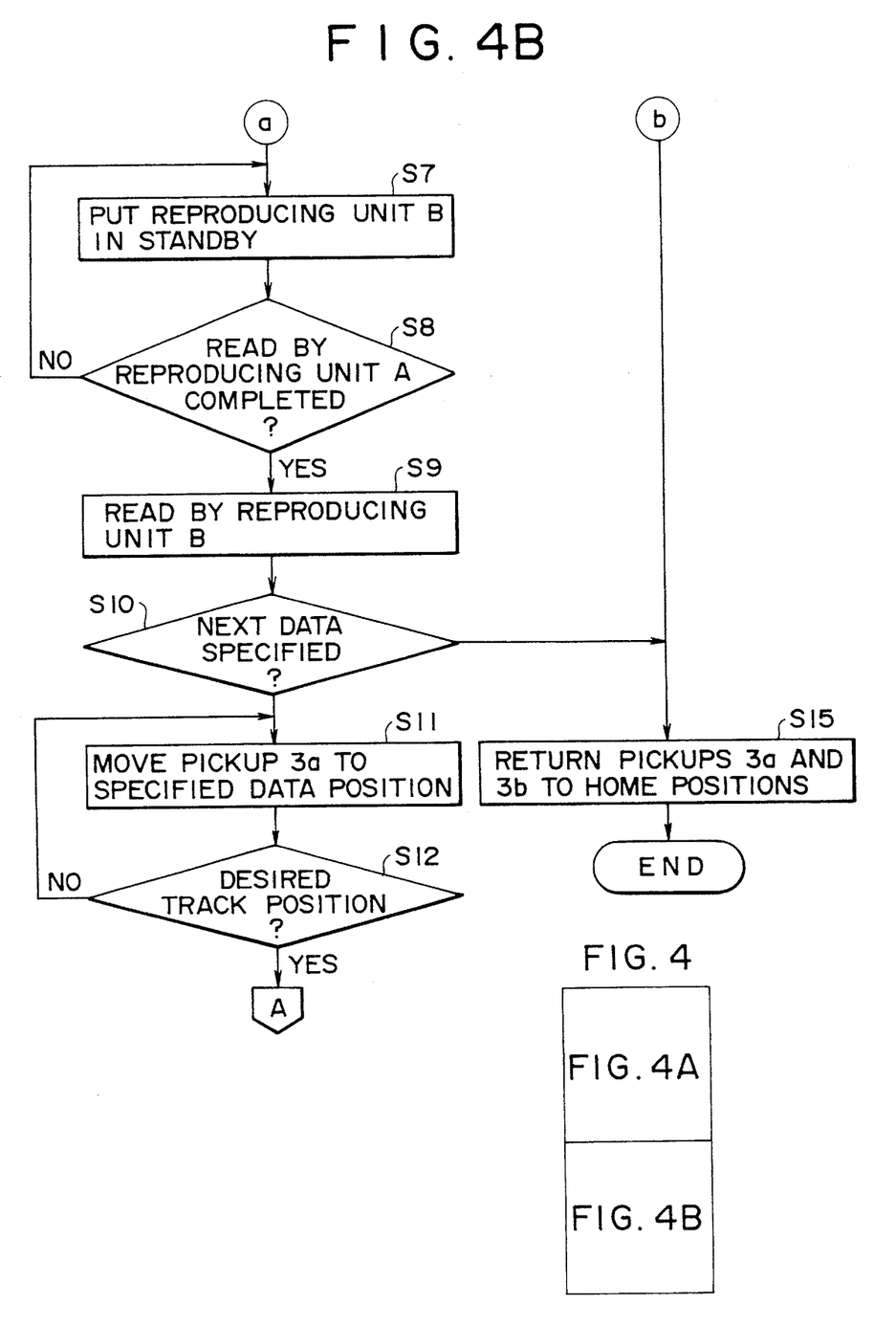
FIG. 4 consisting of FIGS 4A and 4B, is a flowchart describing a processing procedure of a reproducing processing practiced as a fourth preferred embodiment of the invention.
Figure 4A:
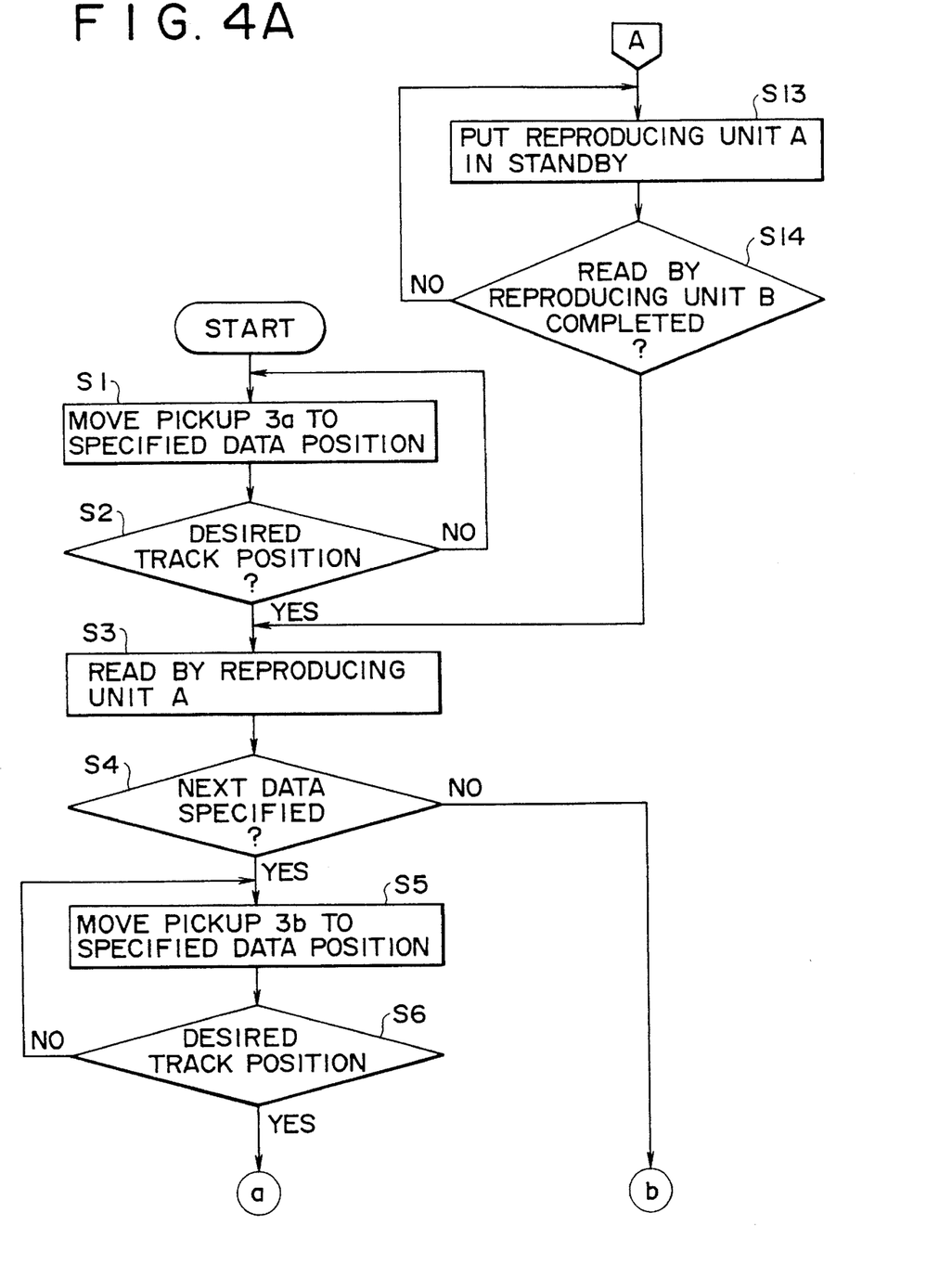

The following describes a processing procedure for a manner in which the two reproducing units A and B are actually used, with reference to the flowchart of FIG. 4, the procedure being practiced as the fourth preferred embodiment of the invention. It should be noted that, in this embodiment, the data read operation is started with the reproducing unit A. First, the system controller 8 moves the pickup 3a of the reproducing unit A to a track position of data specified for being read (step 1). When the pickup 3a has reached the desired track position (step 2), the reproducing unit A starts reading the data (step 3). During the data reading by the reproducing unit A, the selector switch 7 of FIG. 1 remains switched to the reproducing unit A. During the data reading by the reproducing unit A, the system controller 8 determines whether data to be read next has been specified or not (step 4); if the data is found specified, the system controller moves the pickup 3b of the reproducing unit B to a track position of the data to be read (step 5). When the pickup 3b has reached the desired track position (step 6), the system controller puts the reproducing unit B in standby state at that position.

Then, when the data read operation by the reproducing unit A has been completed (step 8), the reproducing unit B exits the standby state to start reading the data (step 9). During the data reading by the reproducing unit B, the selector switch 7 of FIG. 1 remains switched to the reproducing unit B. During the data reading by the reproducing unit B, the system controller determines whether data to be read next has been specified or not (step 10); if the data is found specified, the system controller moves the pickup 3a of the reproducing unit A to a track position of the data to be read next (step 11). When the pickup 3a has reached the desired track position (step 12), the system controller puts the reproducing unit A in standby state at that position (step 13). When the data reading by the reproducing unit B has been completed (step 14), the system controller returns to step 3 to repeat the above-mentioned series of operations. If there is no data to be read next in step 4 or 10, the system controller returns the pickups 3a and 3b respectively to the home position (step 15), terminating the series of operations.

Thus, the constitution in which the two pickups 3a and 3b, for example, are provided and the signal processors 4a and 4b are made follow the number of rotations of the disc 1 by the actions of the spindle servo circuits 6a and 6b, respectively, allows the reproducing unit A and the reproducing unit B to perform data reading at the same time. Therefore, while one reproducing unit is reading data, the other reproducing unit is moved to the track position of data to be read next to be put in standby state, thereby reducing the seek time almost to zero and therefore realizing high-speed seek. The next data reading starts immediately after the previous data reading has been completed, so that a mean access time required between reading operations of one piece of data and another can be reduced significantly as compared with the related-art techniques.

In the embodiment of FIG. 4, while one of the two reproducing units A and B is reading data, the other reproducing unit is in standby state on the track position of the data to be read next. However, such a constitution cannot attain the above-mentioned high-speed seek if, for example, the data to be read next is not known in advance or the data being read is very short and therefore there is no enough time for moving the pickup of the other reproducing unit to the track position of the specified data. In such a case, the reduction of seek time can only be attained by moving the pickup to the desired track position faster than usual.

However, since, in the case of a CD, data 10 recorded in the CLV (Constant Linear Velocity) scheme, correct spindle servo cannot be applied unless data can be reproduced correctly in principle as mentioned before. To be more specific, when the optical system is traversing, the laser beam is completely reflected on the mirror surface between tracks, maximizing the potential level of the RF signal. At this moment, if control is made in the pull-in mode (by the rough servo circuit 610) in the spindle servo circuits 6a and 6b of FIG. 3, the mirror signal is erroneously recognized as the reproduced frame synchronization signal and its period is controlled to the 11T signal, thereby making the rotational control out of order. When traverse is made in the other servo mode, the phase lock mode (by the phase lock servo circuit 620), continuity of the EFM signal cannot be maintained and, when jump is made over to an adjacent track, the interval of the reproduced frame synchronization signal gets out of order, eventually putting the rotational control output of order. In any case, spindle servo cannot be controlled correctly during traversing.

Therefore, to minimize the increase in the seek time that is caused in the above-mentioned case, the present embodiment makes the pickup currently reading data continue the read operation until the movement of the other pickup to the specified position has been completed, during which the selector switch 7 of FIG. 1 is switched to the reproducing unit currently reading data, relieving at least the traversing reproducing unit from performing spindle servo control.

This constitution prevents the spindle servo from widely fluctuating during traversing, so that the other pickup that has traversed can immediately begin a data read operation. Thus the time required between the pickup's reaching a data reading position and being able to read the data can be reduced significantly as compared with the conventional technique in which a single pickup completes a data read operation, moves to a next data position after traversing in which spindle servo gets out of order and at which the spindle rotational speed approaches a target value and enters the PLL capture range, and begins reading the next data.

A description will now be made of operations for moving the pickups 3a and 3b to from one track position to another. In this case, track traversing is repeated; actually, however, a linear velocity of the disc 1 is measured beforehand to calculate the number of tracks to be traversed from a target data address and a current data address, starting the traverse. However, because the number of times the disc 1 has rotated during traverse is added to the actual number of traverses, it is difficult to enhance the absolute accuracy of traverse. In other words, if the number of times the disc 1 has rotated during traverse is known, the absolute accuracy can be enhanced.

Figure 5A:
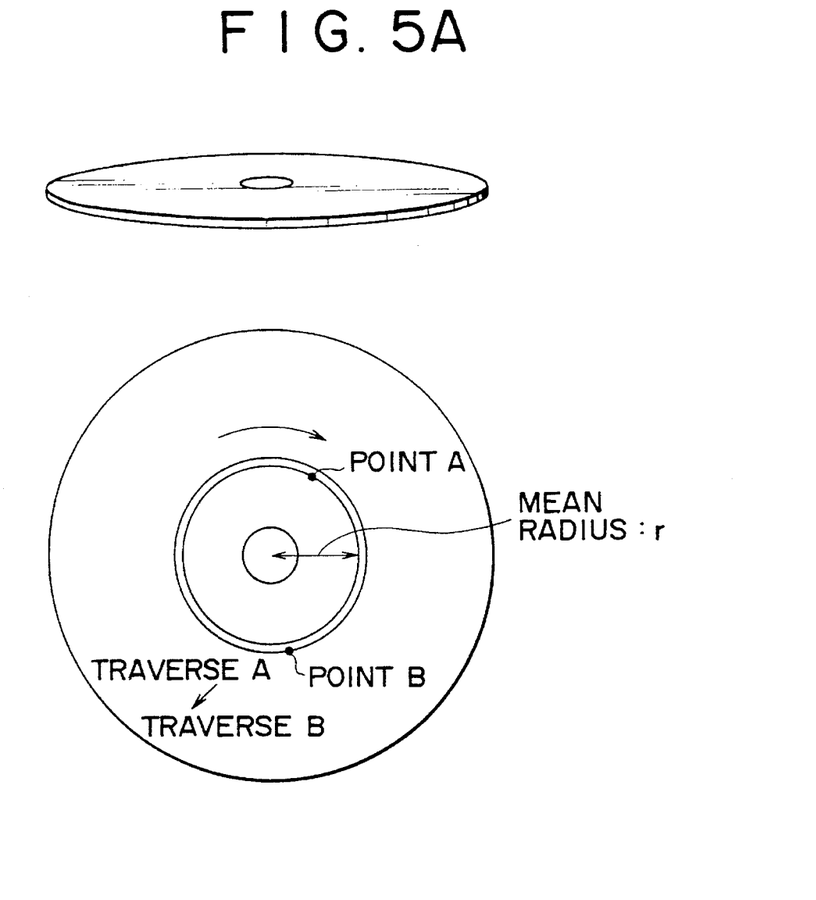
FIGS. 5A and 5B are schematic diagrams illustrating a calculation method of calculating the number of rotations N between traverses practiced as a fifth preferred embodiment of the invention.
Figure 5B:
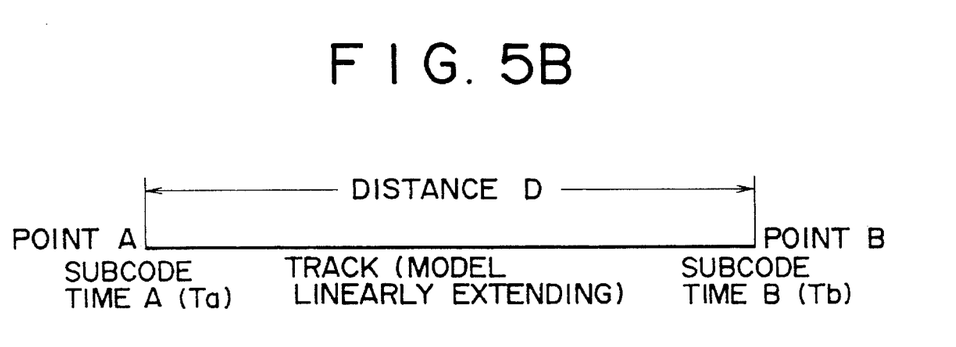

The following describes a method of calculating the number of rotations of the disc 1 made during traverse with reference to FIGS. 5A and 5B, the calculating method being practiced as the fifth preferred embodiment of the invention. First, when a traverse operation has started (traverse A), the system controller 8 detects a subcode (Ta) at that moment from the output of the pickup that is not traversing and stores the detected subcode in memory. Next, when the traverse has completed (traverse B), the system controller detects a subcode (Tb) at that moment from the output of the pickup that is not traversing to stored the detected subcode in memory. This setup permits measurement of the duration of time required for the traverse in subcode.

The linear velocity of the disc 1 fluctuates within the specifications of the disc. This fluctuation is measured by a known measuring method with the disc set on the player. Therefore, for the player, the linear velocity is a known value. From this linear velocity and a time difference between the points A and B, the distance D of the track between the points A and B is obtained based on the following equation:

$$D=(Tb-Ta) \times Lv.$$

Then, from an absolute time between start and stop times, a position (mean radius r of the track) on the disc of the pickup that has reproduced the track is calculated and a circumference of the track is also calculated. Dividing the total track distance traced from start to stop by this circumference provides the number of times the disc has rotated during this period. Namely, the number of rotations N during the traverse period is given as follows:

$$N=D/2\pi r.$$

Thus, the disc player having the above-mentioned constitution provides a relatively wide PLL circuit lock range, so that, if the disc is rotating at any speed, the number of rotations N during the traverse period can be measured correctly. Therefore, when the number of tracks to be traversed is S and the number of rotations N during that traverse is $\Delta S$, $(S+\Delta S)$ tracks are actually traversed involving an error of $\Delta S$. However, correcting the error $\Delta S$ at completion of the traverse can enhance the traversing accuracy.

For a method in which a subcode is read at completion of traverse and an error $\Delta S$ is obtained from the subcode to correct the error $\Delta S$, the subcode needs to be read upon completion of traverse, thereby requiring a time for the correction. On the contrary, according to the above-mentioned novel correction method, the error $\Delta S$ is obtained upon completion of traverse and corrected immediately after the completion of traverse, so that the seek time can be reduced by the amount of time otherwise required, eventually enhancing the seek speed.

As described and according to the present invention, the plurality of data reading pickups are provided and the spindle servo circuits are provided respectively for the plurality of pickups, the spindle servo circuits controlling the frequency of the system clock according to the speed difference between spindle rotational speed and target rotational speed and controlling the spindle rotational speed according to the phase difference between system clock and reference clock. This novel constitution allows the signal processor for performing signal processing based on the system clock to follow the spindle rotational speed, enabling the plurality of pickups to read data simultaneously. Consequently, while one of the pickups is reading data, the other can be moved to a next data reading position and put in a standby state there and, upon completion of the data reading by the reading pickup, start reading the data at the position. Thus, the seek time can be reduced significantly to realize high-speed seek.

While the preferred embodiments of the present invention have been described using specific terms, such description is for illustrative purposes only, and it is to be understood that changes and variations may be made without departing from the spirit or scope of the appended claims.

What is claimed is:

1. A disc player comprising:

a spindle motor for rotationally driving a disc;

a plurality of reading means for reading information recorded on said disc;

clock generating means for detecting a speed difference between spindle rotational speed and target rotational speed based on each of read signals of said plurality of reading means to generate a system clock of which frequency varies according to the detected speed difference;

a plurality of spindle servo means for detecting a phase difference between said system clock and a reference clock to output a servo error signal corresponding to the detected phase difference;

a plurality of signal processing means for processing each of the read signals of said plurality of reading means based on said system clock;

selecting means for selecting one of the output signals of said plurality of spindle servo means to supply the selected signal to said spindle motor; and control means for controlling said selecting means so as to select a servo error signal based on the read signal of one reading means of said plurality of reading means that is performing a reading operation.

2. A disc player according to claim 1, wherein said control means, while said one reading means is performing the reading operation, moves another reading means of said plurality of reading means to a next data reading position and put said another reading means in a standby state.

3. A disc player according to claim 2, wherein said control means obtains the number of disc rotations made during the movement based on time information in the read signal of said one reading means at a time when said another reading means started the movement and time information in the read signal of said one reading means at a time said another reading means completed the movement and performs positional correction at a destination position of said another reading means based on the obtained number of disc rotations.

4. A disc player comprising:

a spindle motor for rotationally driving a disc;

a plurality of reading means for reading information recorded on said disc;

first clock generating means for detecting a speed difference between spindle rotational speed and target rotational speed based on each of read signals of said plurality of reading means to generate a first clock of which frequency varies according to the detected speed difference;

second clock generating means using a crystal oscillator for generating a second clock;

a plurality of spindle servo means for detecting a phase difference between said first clock and said second clock to output a servo error signal corresponding to the detected phase difference;

a plurality of signal processing means for processing each of the read signals of said plurality of reading means based on said first clock;

selecting means for selecting one of the output signals of said plurality of spindle servo means to supply the selected signal to said spindle motor;

control means for controlling said selecting means so as to select a servo error signal based on the read signal of one reading means of said plurality of reading means that is performing a reading operation;

switching means for switching between said first and second clocks outputted from said first and second clock generating means; and system control means for controlling said switching means according to said speed difference between spindle rotational speed and target rotational speed.

5. A disc player according to claim 4, wherein said control means, while said one reading means is performing the reading operation, moves another reading means of said plurality of reading means to a next data reading position and put said another reading means in a standby state.

6. A disc player according to claim 5, wherein said control means obtains the number of disc rotations made during the movement based on time information in the read signal of said one reading means at a time when said another reading means started the movement and time information in the read signal of said one reading means at a time said another reading means completed the movement and performs positional correction at a destination position of said another reading means based on the obtained number of disc rotations.

7. A disc player comprising:

a spindle motor for rotationally driving a disc;

a plurality of reading means for reading information recorded on said disc;

clock generating means for detecting a speed difference between spindle rotational speed and target rotational speed based on each of read signals of said plurality of reading means to generate a system clock of which frequency varies according to the detected speed difference;

peak hold means for detecting the frequency varying according to said speed difference within a predetermined period to hold a minimum frequency of the detected signal;

bottom hold means for detecting, during a predetermined period, a maximum frequency from the value held in said peak hold means;

a plurality of spindle servo means for detecting a phase difference between said system clock and a reference clock to output a servo error signal corresponding to the detected phase difference;

switching control means for switching between said bottom hold means and said plurality of spindle servo means according to a servo switching signal;

a plurality of signal processing means for processing each of the read signals of said plurality of reading means based on said system clock;

selecting means for selecting one of the output signals of said plurality of spindle servo means to supply the selected signal to said spindle motor; and control means for controlling said selecting means so as to select a servo error signal based on the read signal of one reading means of said plurality of reading means that is performing a reading operation.

8. A disc player according to claim 7, wherein said minimum frequency is a 11T pulse.

9. A disc player according to claim 7, wherein said control means, while said one reading means is performing the reading operation, moves another reading means of said plurality of reading means to a next data reading position and put said another reading means in a standby state.

10. A disc player according to claim 9, wherein said control means obtains the number of disc rotations made during the movement based on time information in the read signal of said one reading means at a time when said another reading means started the movement and time information in the read signal of said one reading means at a time said another reading means completed the movement and performs positional correction at a destination position of said another reading means based on the obtained number of disc rotations.

11. A disc player comprising:

a spindle motor for rotationally driving a disc;

a plurality of reading means for reading information recorded on said disc;

clock generating means for detecting a speed difference between spindle rotational speed and target rotational speed based on each of read signals of said plurality of reading means to generate a system clock of which frequency varies according to the detected speed difference;

bottom hold means for detecting the frequency varying according to said speed difference within a predetermined period to hold a maximum frequency of the detected signal;

peak hold means for detecting, during a predetermined period, a maximum frequency from the peak value held in said bottom hold means;

a plurality of spindle servo means for detecting a phase difference between said system clock and a reference clock to output a servo error signal corresponding to the detected phase difference;

switching control means for switching between said bottom hold means and said plurality of spindle servo means according to a servo switching signal;

a plurality of signal processing means for processing each of the read signals of said plurality of reading means based on said system clock;

selecting means for selecting one of the output signals of said plurality of spindle servo means to supply the selected signal to said spindle motor; and control means for controlling said selecting means so as to select a servo error signal based on the read signal of one reading means of said plurality of reading means that is performing a reading operation.

12. A disc player according to claim 11, wherein said maximum frequency is a 3T pulse.

13. A disc player according to claim 11, wherein said control means, while said one reading means is performing the reading operation, moves another reading means of said plurality of reading means to a next data reading position and put said another reading means in a standby state.

14. A disc player according to claim 13, wherein said control means obtains the number of disc rotations made during the movement based on time information in the read signal of said one reading means at a time when said another reading means started the movement and time information in the read signal of said one reading means at a time said another reading means completed the movement and performs positional correction at a destination position of said another reading means based on the obtained number of disc rotations.

* * * * *